United States Patent Office 3,230,204
Patented Jan. 18, 1966

3,230,204
INTERPOLYMERS OF ALDEHYDE MODIFIED AMIDES AND FATTY ACID ESTERS OF HYDROXY-CONTAINING MONOMERS
Le Roy A. Chloupek, Prospect Heights, and Kazys Sekmakas, Chicago, Ill., assignors to De Soto Chemical Coatings, Inc., Chicago, Ill., a corporation of Delaware
No Drawing. Filed Sept. 4, 1962, Ser. No. 221,373
14 Claims. (Cl. 260—80.5)

The present invention relates to alkylolated acrylamide interpolymers containing copolymerized drying oil acid ester of monoethylenically unsaturated hydroxy-containing monomers providing heat-curing interpolymer products which cure to form hard, flexible and, if desired, glossy finishes, even in the absence of any second reactive resin component. These new copolymers or interpolymers are non-gelled and organic solvent-soluble and are especially useful in organic solvent solution coating compositions.

Etherified alkylolated acrylamide-containing interpolymers have previously been used in organic solvent solution coating compositions. However, when the interpolymer is the sole film-forming component of the coating, it is not normally possible to obtain a fully satisfactory combination of properties, especially a combination of film hardness and film flexibility. Also, adhesion to metal bases and recoat adhesion tend to be inadequate. To overcome these difficulties, the interpolymers have been blended with epoxy resins, but this tends to degrade gloss upon prolonged exposure. Blends have also been made with amino-plast resins and alkyd resins, but poor compatibility has lead to many problems such as pigment flocculation, color drift in the package, and loss of gloss.

In accordance with the invention, an acrylamide is copolymerized with other polymerizable monoethylenically unsaturated materials including from 3–50% by weight, preferably from 5–30% by weight of drying oil acid ester of ethylenically unsaturated hydroxy-containing monomers, and preferably also including at least 35% by weight of a monomer selected from the group consisting of styrene, $C_1$–$C_4$ alkyl-substituted styrene and halogen-substituted styrene, and methyl methacrylate to produce a non-gelled solvent-soluble copolymer or interpolymer. At least a portion of the amido hydrogen atoms in the interpolymer are replaced by the structure

wherein R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical. Preferably, R is hydrogen and, to the extent that etherification is desired or permitted, the etherifying alcohol provides an ether group in which $R_1$ is an alkyl radical containing from 3–8 carbon atoms.

As will be more fully appreciated hereinafter, considerable variation is permissible in the kind and ratio of ethylenically unsaturated materials which are used, the aldehyde modifying agent, the etherifying agent and the extent of etherification.

The preferred unsaturated amide is acrylamide, but other acrylamide monomers such as methacrylamide and itaconate diamide may be used. Indeed, amides of other unsaturated acids such as maleic acid diamide, fumaric acid diamide, sorbic acid amide and muconic acid diamide may less desirably be used.

It is preferred to employ the acrylamide monomer in proportions of from 5 to 45%, preferably from 5 to 30% by weight, based on the total weight of unsaturated material subjected to copolymerization.

The unsaturated amide component is essential to the interpolymers of the invention since amido hydrogen atoms are reacted with an aldehyde, preferably formaldehyde to provide reactive alkylol groups which are relied upon to enable the interpolymer to be cured. Alkylolation, which will be discussed more fully hereinafter, is thus essential to the invention. Etherification of some or all of the alkylol groups is optional and is not essential, as will also be discussed more fully hereinafter.

A second essential component of the interpolymer is drying oil fatty acid ester of monoethylenically unsaturated hydroxy-containing monomers, especially esters of 2-hydroxy ethyl methacrylate with unsaturated fatty acids containing a significant proportion of conjugated unsaturation, e.g., the fatty acids derived from frosting oils such as dehydrated castor oil.

Various monoethylenically unsaturated monomers containing the hydroxy group may be used for coreaction with drying oil fatty acid to form the ester component used in the invention. These are most simply illustrated by allyl alcohol and methallyl alcohol, but the invention preferably employs, as the monomer under discussion, the ester reaction product of an unsaturated acid with a polyhydric alcohol, the preferred 2-hydroxy ethyl methacrylate falling within this category. Other preferred monomers which may be used are illustrated by other hydroxy alkyl methacrylates and acrylates such as 2-hydroxy propyl methacrylate, 3-hydroxy propyl methacrylate, 4 - hydroxy butyl methacrylate and 2 - hydroxy ethyl acrylate. Still further hydroxy-containing monomers which may be used are ethylene glycol allyl ether, propylene glycol allyl ether, butylene glycol allyl ether, diethylene glycol allyl ether, and trimethylol propane allyl ether. The most preferred allyl ether which provides excellent results in the invention is glycerol monoallyl ether. Similarly, glycerol monocrotonate, acrylate or methacrylate are useful in the invention. Another monomer, illustrative of the diverse monomers which may be used is 2-hydroxy-methyl-5-norbornene (either the endo isomer or the exo isomer or mixtures thereof).

Various drying oil fatty acids may be used, including frosting oil and semi-drying oils. Thus, the fast drying oil fatty acids having two or more conjugated double bonds in an acid radical, e.g., the acids derived from China-wood oil, oiticica oil and dehydrated castor oil, are preferred, but the invention includes the acids derived from medium drying oils having one to three or more non-conjugated double bonds in the acid radical of the oil molecule such as perilla oil, linseed oil, soy bean oil and the glycerides of the clupanodonic acid of fish oils and semi-drying oils having about two non-conjugated double bonds in an acid radical thereof such as poppyseed, rapeseed and sunflower seed oils.

It is not essential that the hydroxyl groups of the unsaturated monomer be completely esterified, though at least 50%, and preferably at least 80% of the available hydroxyl groups are desirably esterified to provide extensive internal flexibilization.

The unsaturated ester component is used in the proportions previously defined, most desirably in a proportion of from 7–20% by weight of total polymerizable components, with the ester being esterified to an extent of at least 90% of the hydroxyl groups available for esterification.

The interpolymers should also contain a third copolymerizable ethylenically unsaturated component, preferably monomers containing the $CH_2\!\!=\!\!C\!<$ group. Indeed, a feature of the invention is the provision of an interpolymer which can cure through its alkylol reactivity and which, nonetheless, contains flexibilizing oil as an integral part thereof and which can, therefore, tolerate extensive proportions of inexpensive vinyl monomer providing extensive hardness and desirable physical characteristics to the interpolymer. Thus, the invention prefers to employ at least 35%, preferably at least 40%, based on the weight of the copolymerized components of methyl methacrylate, styrene, or other $C_1$–$C_4$ alkyl- or halo-substituted styrene in which the substituent is on the aromatic ring such as vinyl toluene, dimethyl styrene, isopropyl styrene or monochlorstyrene. Of the substituted styrenes, vinyl toluene is preferred.

Any balance of the interpolymer may be constituted by $C_2$–$C_{20}$ acrylates, methacrylates and crotonates illustrated by ethyl acrylate, butyl methacrylate, butyl crotonate, 2-ethyl hexyl acrylate and stearyl acrylate; or other vinyl monomers, such as vinyl acetate, n-butyl vinyl ether, glycidyl methacrylate or acrylonitrile; or by small proportions of unsaturated acids, such as acrylic acid or methacrylic acid; or by monomers which do not contain the $CH_2{=}C{<}$ group such as maleic acid or anhydride, maleic or fumaric acid monoesters and diesters, etc.

Even polymerizable ethylenically unsaturated polymeric material may be used such as the unsaturated polyester resins disclosed in the copending application of Kazys Sekmakas, Serial No. 115,330, filed June 7, 1961, now United States Patent No. 3,163,615, the disclosure of which is hereby incorporated by reference.

Stated briefly, one may incorporate 5% or more of unsaturated polyester resin containing from 0.005 to 0.40 gram mol of ethylenically unsaturated component per 100 grams of polyester, especially polyesters in which the unsaturation in the polyester is substantially confined to side chains in the polyester structure as by the use of a monoethylenically unsaturated monofunctional component such as crotonic acid or allyl alcohol in an amount to provide from 0.03–0.3 gram mol of unsaturated component per 100 grams of polyester.

The interpolymers of the invention are desirably produced by a single stage solution copolymerization which is more fully described in the copending application of Kazys Sekmakas, Serial No. 100,804, filed April 5, 1961, now United States Patent No. 3,163,623, the disclosure of which is hereby incorporated by reference. Thus, organic solvent, aldehyde, an acrylamide and other ethylenically unsaturated material are reacted with one another in the presence of heat and in the presence of a basic catalyst and a free-radical generating polymerization catalyst, and polymerization and alkylolation take place simultaneously. Preferably, the monomers are added to the organic solvent solution which is added slowly and at a uniform rate (desirably by continuous addition) to permit more precise control of the reaction and to provide a more uniform interpolymer product. Also, continuous monomer addition enables temperature control during the reaction despite the highly exothermic reaction which normally occurs. In the presence of alcohol and with continuous removal of water, as by refluxing coupled with azeotropic distillation, etherification takes place at the same time and some of the methylol groups in the alkylolated product may be etherified if desired.

The alkaline catalyst is essential to the single stage reaction, for its absence leads to the production of an insoluble gelled structure which is not useful.

At least 0.1% of alkaline catalyst, based on the weight of monomers being copolymerized, is essential to avoid gelation. On the other hand, it is preferred to use not more than 1.0% of alkaline catalyst because the products so-produced have slow curing properties and are less desirable.

Any alkaline compound may be used, those having a nitrogen base being preferred. Amines, and especially tertiary amines are particularly preferred. Thus, inorganic alkaline compounds such as alkali metal hydroxides and alkaline earth metal hydroxides are broadly operable, but are not preferred because these introduce impurities into the resinous product. Ammonia is quite suitable as are quaternary ammonium compounds such as tetramethyl ammonium hydroxides. Amines such as ethyl amine and butyl amine may be used. However, tertiary amines illustrated by triethyl amine, tripropyl amine and tributyl amine are particularly preferred. The degree of etherification may be changed, and thereby controlled, by changing the amount of alkaline catalyst which is employed and by controlling the water which is removed.

The aldehyde modifying agent, when used, is desirably used in an amount of from 0.2–5 equivalents of aldehyde, and preferably in an amount of from 1–2 equivalents of aldehyde for each amide group used in the formation of the acrylamide interpolymer. The preferred aldehyde is formaldehyde. Other monoaldehydes, including acetaldehyde, propionaldehyde, butyraldehyde, and furfural, or substances yielding an aldehyde, such as paraformaldehyde, hexamethylene tetramine or trioxymethylene can also be used.

Etherification of the aldehyde-modified amide interpolymer may be employed, but is not essential. Lower alcohols containing up to 10 carbon atoms, especially butanol, are preferred for etherification and the etherification reaction may be carried out up to 100% of the alkylol radical present in the interpolymer although partial etherification is preferred. The degree of etherification is easily controlled in accordance with the invention by adjusting the proportion of alkaline catalyst, and by controlling the proportion of water removed, such control being a feature of the invention. When less than 100% etherification is effected, the product is a mixture in which the amido hydrogen atoms in some of the acrylamide interpolymer molecules are replaced by the structure —ROH, and the amido hydrogen atoms in other of the acrylamide interpolymer molecules are replaced by the structure —ROR$_1$, R representing a saturated aliphatic hydrocarbon radical introduced by the aldehyde modifying agent and R$_1$ is the residue of the etherifying alcohol.

As previously indicated, the monomers are preferably dissolved in the organic solvent which is introduced into the reaction vessel slowly and at a uniform rate (desirably by continuous addition) to permit more precise control of the reaction and to provide a more uniform interpolymer product. Also, continuous monomer addition enables temperature control during the reaction despite the highly exothermic reaction which normally occurs.

Chain terminating agents, such as mercaptans, may be used to exert their known effect of lowered average molecular weight.

Any free-radical generating polymerization catalyst may be used, the selection of catalyst being determined by the desired temperature of the polymerization reaction. The important point is that the agent liberate free radicals under the conditions of polymerization so that the addition polymerization is facilitated.

Thus, copolymerization catalyst which generate free radicals starting at low temperature, e.g., from 30–50° C. are usable, these being illustrated by acetyl benzoyl peroxide, peracetic acid, hydroxybutyl peroxide, isopropyl percarbonate, cyclohexanone peroxide, cyclohexyl peroxide, 2,4-dichlorobenzoyl peroxide, and cumene hydroperoxide.

Suitable catalyst which are active to begin generating free radicals at somewhat more elevated temperatures of about 60° C. are illustrated by t-butyl hydroperoxide, methyl amyl ketone peroxide, acetyl hydroperoxide, lauroyl peroxide, methyl cyclohexyl hydroperoxide, t-butyl permaleic acid, t-butyl perbenzoate, di-t-butyl diperphthalate, N,N'-azodiisobutyronitrile and benzoyl peroxide.

Preferably, free-radical generating catalyst which become active at still more elevated temperatures of about 100° C. are used in accordance with the invention, these being illustrated by t-butyl perphthalic acid, p-chlorobenzoyl peroxide, t-butyl peracetate, dibenzal diperoxide and di-t-butyl peroxide.

The particular nature of the organic solvent used for the solution copolymerization or for the solvent solution application of the interpolymers or mixtures containing the same is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, Cellosolve, butyl Cellosolve, etc.

While a feature of the invention is the achievement of outstanding coating properties in the absence of other film-forming resins, this is not to intimate that the interpolymers of the invention may not be blended with other resins. Indeed, the interpolymers of the invention are quite compatible and tolerate large proportions of aminoplast resins, up to about 60% of the total weight of the mixture thereof with the interpolymers of the invention.

Thus, a subsidiary feature of the invention is the formation of blends of the interpolymers of the invention with from 15 to 60%, based on the total weight of the mixture, of heat-hardening, solvent-soluble condensation products of amines, such as urea, melamine, or other triazine with excess formaldehyde. As is well known, solvent solubility is usually provided by etherifying the aminoplast resin with a $C_3$–$C_8$ alcohol, preferably butanol.

Alkyd resins may also be used in combination with the interpolymers of the invention, especially alkyd resins having a high hydroxyl number or a high carboxyl number for cross-linking reaction with the alkylol groups, e.g., the methylol groups of the interpolymer. The alkyd resin may be oil-modified or it may be copolymerized with vinyl monomer, especially with vinyl monomers including a major proportion of methyl methacrylate.

Epoxy resins, such as polyglycidyl ethers of dihydric phenols, especially bisphenols, may also be blended with the interpolymers of the invention, the epoxide groups of the epoxy resin being reactive with the alkylol groups of the interpolymer for cross-linking cure.

Moreover, blends may be made with vinyl polymers, especially reactive vinyl polymers such as a partially hydrolyzed copolymer of 87% by weight of vinyl chloride and 13% by weight of vinyl acetate. Another illustration of an appropriate reactive vinyl resin is a copolymer of 86% by weight of vinyl chloride, 13% by weight of vinyl acetate and 1% by weight of maleic acid.

The interpolymers of the invention are preferably cured in the presence of an acid catalyst which may be provided externally, as by the introduction of a small amount of paratoluene sulfonic acid, or internally as by the inclusion in the interpolymer of a carboxyl terminated polyester resin, or by the provision of blends in which the reactive resin blended with the interpolymer includes carboxyl functionality such as carboxyl-terminated polyesters and acid-containing vinyl copolymers.

The invention is illustrated in the examples which follow.

EXAMPLE 1

A typical unsaturated ester for use in the invention is prepared in the following manner.

Charge to a reaction flask equipped with a thermometer, heating mantle, nitrogen inlet and stirrer, 400 grams of glycerol monoallyl ether and 800 grams of dehydrated castor oil fatty acids.

The mixture is heated to 400° F. and held for an acid value less than 2.

The formed ester containing allyl unsaturation has the following physical characteristics:

Solids (percent) _____ 100
Acid value _____ 1.9

EXAMPLE 2

The production of an etherified methylolated acrylamide interpolymer using the unsaturated ester of Example 1 by a two-stage procedure is as follows:

| | Grams |
|---|---|
| Mixture of aromatic hydrocarbon solvents having a boiling range of from 375–410° F. | 500 |
| n-Butanol | 225 |
| Charge into reactor heat to 255° F. | |
| Acrylamide | 300 |
| 2-methoxy ethanol | 225 |
| n-Butanol | 225 |
| 2-butoxy ethanol | 330 |
| Dissolve acrylamide in solvents | |
| Fatty acid ester of Example 1 | 180 |
| Styrene | 525 |
| Methyl acrylate | 225 |
| Butyl acrylate | 270 |
| Di-tert.-butyl peroxide | 7.5 |
| Benzoyl peroxide | 9.0 |
| Tert.-dodecyl mercaptan | 30.0 |
| Premix acrylamide solution with fatty acid ester, monomers and catalysts to form a monomer mixture | |
| 40% solution of formaldehyde in n-butanol | 600 |
| Maleic anhydride | 9 |

Procedure of preparation

The monomer mix is added to the reactor containing heated solvents over a 2½ hour period of time while maintaining the temperature at 260° F. After addition is completed, the reaction mixture is held for an additional 8 hours at 260–265° F.

The 40% solution of formaldehyde in n-butanol and the maleic anhydride are added and the mixture is azeotropically distilled to remove 120 grams of water.

The resulting interpolymer has the following physical characteristics:

Solids (percent) _____ 50.1
Viscosity (Gardner) _____ V
Color (Gardner) _____ 4–5

EXAMPLE 3

Example 2 is repeated with the charge listed below:

| | Grams |
|---|---|
| Mixture of aromatic hydrocarbon solvents having a boiling range of from 375–410° F. | 333 |
| 2-methoxy ethanol | 133 |
| Acrylamide | 130 |
| 2-butoxy ethanol | 320 |
| n-Butanol | 200 |
| Fatty acid ester of Example 1 | 70 |
| Styrene | 400 |
| Methyl acrylate | 100 |
| Butyl acrylate | 300 |
| Di-tert.-butyl peroxide | 5 |
| Benzoyl peroxide | 5 |
| Tert.-dodecyl mercaptan | 10 |
| 40% solution of formaldehyde in n-butanol | 275 |
| Maleic anhydride | 5 |

35 grams of water are removed by azeotropic distillation to provide an interpolymer having the following physical characteristics:

Solids (percent) _____ 49.7
Viscosity (Gardner) _____ U–V
Color (Gardner) _____ 2

EXAMPLE 4

To illustrate a slightly different reaction procedure in which the unsaturated ester is present initially and acrylamide is introduced with the other monomers, Example 2 is repeated with the following charge:

| | Grams |
|---|---|
| Mixture of aromatic hydrocarbon solvents having a boiling range of from 375–410° F. | 333 |
| n-Butanol | 133 |
| Fatty acid ester of Example 1 | 110 |
| Acrylamide | 130 |
| 2-butoxy ethanol | 320 |
| n-Butanol | 200 |
| Styrene | 430 |
| Ethyl acrylate | 330 |
| Benzoyl peroxide | 5 |
| Di-tert.-butyl peroxide | 5 |
| Tert.-dodecyl mercaptan | 10 |
| 40% solution of formaldehyde in n-butanol | 275 |
| Maleic anhydride | 4 |

EXAMPLE 5

If desired, the fatty acid ester may be formed after the interpolymer is formed, as indicated below:

| | Grams |
|---|---|
| Monobutyl ether of diethylene glycol | 300 |
| Xylol | 100 |
| Glycerol allyl ether | 25 |
| Heat to 275° F. using nitrogen sparge | |
| Acrylamide | 130 |
| Monobutyl ether of diethylene glycol | 520 |
| Dissolve acrylamide and premix with monomers and catalysts | |
| Styrene | 450 |
| Ethyl acrylate | 345 |
| Di-tert.-butyl peroxide | 5 |
| Benzoyl peroxide | 5 |
| Tert.-dodecyl mercaptan | 8 |
| Add over 2 hour period to reactor. Hold for 2 hours at 280° F. | |
| Dehydrated castor oil fatty acids | 50 |
| Add. Set Dean-Stark trap. Fill with xylol. Heat to 400° F. Hold for 2 hours. Cool to 230° F. | |
| 40% solution of formaldehyde in n-butanol | 275 |
| Maleic anhydride | 4 |
| Add | |

After the 40% solution of formaldehyde in n-butanol and the maleic anhydride are added, the mixture is azeotropically distilled to remove 27 grams of water.

The product is then cooled and filtered to provide an interpolymer having the following physical characteristics:

| | |
|---|---|
| Solids (percent) | 49.85 |
| Viscosity (Gardner) | Z |
| Color (Gardner) | 6 |

To illustrate the compatibility of the interpolymer of Example 2, the interpolymer is used in enamel formulations containing 28% titanium dioxide rutile and 32% non-volatile resin solids, the enamel being ground in a pebble mill to obtain a 7½ N.S. grind gauge reading.

The following results are obtained when a .003″ wet film drawdown of the enamels is made on bare steel panels and baked for 20 minutes at 350° F.

TABLE I

| Modifier | Resin component of enamels | | Gloss and appearance | Pencil hardness | Flexibility (conical mandrel) | Toluol resistance |
|---|---|---|---|---|---|---|
| | Percent modification | Percent interpolymer of Example 2 | | | | |
| None | | 100 | Excellent | | Pass ⅛″ bend | Fair. |
| 0.5% phosphoric acid | | 100 | do | | do | Very good. |
| Castor baking alkyd (See Note 1) | 25 | 75 | do | H | do | Excellent. |
| Acrylated alkyd (See Note 2) | 25 | 75 | do | H-2H | do | Good. |
| Epoxy resin (See Note 3) | 20 | 80 | do | H-2H | do | Excellent. |
| Epoxy ester (See Note 4) | 25 | 75 | do | H | do | Very good. |
| Melamine-formaldehyde condensate (See Note 5) | 25 | 75 | Very good | 2H-3H | Pass ⅝″ bend | Good. |
| Triazine resin (See Note 6) | 45 | 55 | Excellent | 3H | do | Excellent. |
| Urea resin (See Note 7) | 45 | 55 | Very good | 2H | do | Very good. |
| Partially hydrolyzed vinyl acetate copolymer (See Note 8) | 20 | 80 | Fair | H | Pass ⅛″ bend | Do. |

Note.—0.5% phosphoric acid used to cure all blends.

Note 1.—The castor oil baking alkyd is the polyesterification reaction product of 33.8% dehydrated castor oil, 39% phthalic anhydride, 25.5% glycerine and 1.7% benzoic acid prepared by heating the castor oil, 11 parts of glycerine and 0.03 part of lead oxide to 450° F., until the product is soluble in an equal volume of methyl alcohol, cooling the resulting product to 380° F., and adding to the cooled product phthalic anhydride, benzoic acid and 14.5 parts of glycerine, and heating to 420° F. until the acid value is reduced to 6.

Note 2.—The acrylated alkyd consists of 42% dehydrated castor oil, 10% glycerine, 18% phthalic anhydride, 27% methyl methacrylate and 3% styrene and is prepared by charging the castor oil and the glycerine and heating to 400° F., adding 0.17% of 24% lead naphthenate and heating to 450° F. which is maintained until alcoholysis takes place (1:1 in methyl alcohol). After cooling the reaction product to 400° F., phthalic anhydride is added and the temperature is increased to 430° F. where it is held until a viscosity of D (Gardner scale measured at 60% solids in xylol) is obtained. The product is then cut to 80% solids with xylol and cooled to 270° F. and a mix of methyl methacrylate, styrene and di-tert-butyl peroxide catalyst is added slowly over a three hour period. When the addition is complete the temperature is increased to 280° F. for four hours and the copolymer product is cut to 60% resin solids with xylol.

Note 3.—The epoxy resin is a substantially diglycidyl ether of 2,2′-bis(p-hydroxyphenyl)propane) having a molecular weight of about 1000, an epoxide equivalent weight of about 500 (grams per epoxide equivalent weight), and a melting point of from 65–75° C.

Note 4.—The epoxy ester is a substantially diglycidyl ether of 2,2′-bis(p-hydroxyphenyl)propane) having a molecular weight of about 3800, an epoxy value of 0.05 equivalent/100 grams and a melting point of from 127–133° C. The epoxy ester consists of 70% by weight epoxy resin, 15% soya oil fatty acids and 15% dehydrated castor oil and is prepared by charging the reactants into a reactor along with 2% xylol. The mixture is heated to 480° F. until an acid number of about 10 is reached. The product is diluted to 50% solids with xylol/butanol (1:1).

Note 5.—A heat-hardenable solvent-soluble melamine-formaldehyde condensate etherified with butanol to provide solvent solubility is employed in the form of a 55% by weight resin solids solution containing 25% butanol and 20% xylol. The melamine-formaldehyde resin is provided by heat reacting 5.5 mols of formaldehyde with 1 mol of melamine in the presence of excess butanol and a small amount of acid catalyst.

Note 6.—The triazine resin is a condensation product of 4 mols of formaldehyde with 1 mol of benzoguanamine in the presence of excess butanol and an acid catalyst to provide a heat-hardening resin etherified with butanol to provide solvent solubility. The benzoguanamine-formaldehyde resin solution has a viscosity on the Gardner-Holdt scale at 25° C. of G–K.

Note 7.—The urea resin utilized is a solution of 60% resin solids of the heat-hardenable reaction product of urea with formaldehyde in a solvent consisting of butanol/xylol (weight ratio 20/30), having a viscosity of L–Q (Gardner-Holdt scale at 25° C.), and an acid number of 3–8 (computed on resin solids). One mol of urea is reacted with 2 mols of formaldehyde under alkaline conditions to form a resinous condensation product which is then etherified with one mol of butanol in the presence of a trace of phosphoric acid.

Note 8.—The partially hydrolyzed vinyl acetate copolymer is a copolymer containing 91% by weight of vinyl chloride, the balance of the copolymer being vinyl acetate which has been partially hydrolyzed to provide a vinyl alcohol content of 6% by weight.

To illustrate the compatibility and performance of the interpolymer of Example 3, this interpolymer is used in enamel formulations in the same manner indicated hereinbefore to provide the following characteristics:

TABLE II

| Modifier | Resin component of enamels | | Gloss and appearance | Pencil hardness | Flexibility (conical mandrel) | Toluol resistance |
|---|---|---|---|---|---|---|
| | Percent modification | Percent interpolymer of Example 3 | | | | |
| None | | 100 | Excellent | H-B | Pass ⅛″ bend | Fair. |
| Resinous polyol ester (See Note 9) | 25 | 75 | ____do____ | H-B | ____do____ | Do. |
| Melamine-formaldehyde condensate (See Note 5, Table I). | 25 | 75 | ____do____ | H | ____do____ | Good. |
| Partially hydrolyzed vinyl acetate copolymer (See Note 8, Table I). | 20 | 80 | Very good | H-B | ____do____ | Excellent. |
| Castor baking alkyd (See Note 1, Table I) | 25 | 75 | Good | H-B | ____do____ | Fair. |

NOTE.—0.5% phosphoric acid used to cure all blends.
NOTE 9.—The resinous polyol is a copolymer of styrene and allyl alcohol having an average molecular weight of 1,150 and an average equivalent weight, based on hydroxyl functionality, of 222.

In order to determine the ability of unsaturated fatty acid esters to react with acrylamide and other ethylenically unsaturated monomers, a group of three fatty acid esters are prepared. Each ester contains ethylenic unsaturation of a different type as follows:

*Ester A.*—2-hydroxy ethyl methacrylate esterified with dehydrated castor oil fatty acids.

*Ester B.*—2-hydroxy methyl-5-norbornene esterified with dehydrated castor oil fatty acids.

*Ester C.*—Glycerol-crotonic acid-dehydrated castor oil fatty acids unsaturated ester.

Esters A–C are prepared by simply mixing the components specified in the table which follows and heating them to 380–400° F. until the desired acid value is reached.

TABLE III

| | Ester A | Ester B | Ester C |
|---|---|---|---|
| Dehydrated castor oil fatty acids, grams | 840 | 1,400 | 1,120 |
| 2-hydroxy ethyl methacrylate, grams | 500 | | |
| 2-hydroxy methyl-5-norbornene, grams | | 780 | |
| Glycerol, grams | | | 225 |
| Crotonic acid, grams | | | 130 |
| Solids (percent) | 97.8 | 99 | 98 |
| Viscosity (Gardner-Holdt) | A-B | A | F |
| Color (Gardner-Holdt) | 6 | 5-6 | 6 |
| Acid value | 29.6 | 12 | 20.8 |

The above formed Esters A–C are reacted into interpolymers using the following monomer composition:

| Ingredients | Interpolymer, percent | | |
|---|---|---|---|
| | I | II | III |
| | 2-hydroxy ethyl methacrylate ester A | 2-hydroxy methyl-5-norbornene ester B | Glycerol crotonate ester C |
| Acrylamide | 15 | 15 | 15 |
| Styrene | 45 | 45 | 45 |
| Ethyl acrylate | 30 | 30 | 30 |
| Ester A | 10 | | |
| Ester B | | 10 | |
| Ester C | | | 10 |
| | 100 | 100 | 100 |
| Final characteristics of interpolymer: | | | |
| Solids (percent) | 47.3 | 48.3 | 48.5 |
| Viscosity (Gardner-Holdt) | V | R | T |
| Color (Gardner-Holdt) | 1-2 | 1 | 1-2 |

The production of the above interpolymers is illustrated by the following:

*Charge composition*

| | Grams |
|---|---|
| n-Butanol | 250 |
| Xylol | 330 |
| Paraformaldehyde | 100 |
| Acrylamide | 150 |
| n-Butanol | 470 |
| Styrene | 450 |
| Ethyl acrylate | 300 |
| Fatty acid-unsaturated alcohol ester | 100 |
| Di-tert-butyl peroxide | 5 |
| Azobisbutyronitrile | 5 |
| Tertiary dodecyl mercaptan | 18 |
| Triethyl amine | 3 |
| Cumene hydroperoxide | 5 |

*Procedure of polymerization*

Charge 330 grams of xylol, 250 grams of butanol, and 100 grams of paraformaldehyde into a reactor equipped with an agitator, condenser, thermometer and nitrogen inlet.

The mixture is heated to reflux temperature (235–245° F.). Then dissolve acrylamide in 470 grams of butanol and all monomers. To this monomer blend add catalysts and mercaptan. The monomer-catalyst blend is added to the reactor over a 2½ hour period while maintaining the temperature at 245–255° F. After addition is completed, the reaction mixture is held for an additional 10–12 hours until conversion is complete.

The resins of Interpolymers I, II and III are utilized in enamel formulations containing 28% titanium dioxide and 32% non-volatile resin, the enamels being ground in a pebble mill to obtain a 7½ N.S. grind gauge reading.

A 0.003″ draw down of the enamels are made on chromate treated steel panels and baked for 20 minutes at 325° F.

The following results are obtained:

| | Interpolymer (cured with 0.5% phosphoric acid) | | |
|---|---|---|---|
| | I | II | III |
| | 2-hydroxy ethyl methacrylate ester A | 2-hydroxy methyl-5-norbornene ester B | Glycerol crotonate ester C |
| Gloss reading (photovolt 60°) | 92 | 89 | 87. |
| Visual Gloss and Appearance | Excellent | Very good | Very good. |
| Pencil Hardness | 2H-3H | 2H | 2H. |
| Flexibility | Pass ¼″ Mandrel | Pass ¼″ Mandrel | Pass ¼″ Mandrel. |
| Impact (forward) | 30 | 20 | 25. |
| Mar resistance | Very good | Good | Good. |

The superior performance of Interpolymer I containing 2-hydroxy ethyl methacrylate is self-evident.

The invention is defined in the claims which follow.

We claim:

1. A solvent-soluble non-gelled interpolymer of: (A) from 5–45% by weight, based on the total weight of unsaturated polymerizable material, of an amide of a monoethylenically unsaturated carboxylic acid; (B) at least one other polymerizable ethylenically unsaturated material copolymerizable with said amide; and (C) from 3–50%, based on the total weight of unsaturated polymerizable material, of drying oil acid ester of ethylenically unsaturated hydroxy-containing monomer copolymerizable with said amide and said other polymerizable ethylenically unsaturated material, said drying oil acid esterifying at least 50% of the hydroxy groups of said hydroxy-containing monomer, said component (B) constituting the balance of said interpolymer, at least a portion of the amido hydrogen atoms in the interpolymer being replaced by the structure

in which R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical.

2. An interpolymer as recited in claim 1 in which said amide is an acrylamide and said component (B) is a monomer having a $CH_2{=}C{<}$ group.

3. An interpolymer as recited in claim 1 in which said component (B) includes monomer selected from the group consisting of styrene, $C_1$–$C_4$ alkyl-substituted styrene, halogen-substituted styrene and methyl methacrylate in an amount of at least 35% by weight, based on the total weight of unsaturated polymerizable material.

4. An interpolymer as recited in claim 1 in which said component (C) is present in an amount of from 5–30%, on said weight basis.

5. An interpolymer as recited in claim 1 in which said component (C) is 2-hydroxy ethyl methacrylate and said drying oil acid is a frosting oil acid.

6. An interpolymer as recited in claim 5 in which the hydroxy groups of said 2-hydroxy ethyl methacrylate are esterified by said frosting oil acid to an extent of at least 90%.

7. A solvent-soluble non-gelled interpolymer of: (A) from 5–45% by weight, based on the total weight of unsaturated polymerizable material, of an acrylamide; (B) at least one other polymerizable ethylenically unsaturated material copolymerizable with said acrylamide; and (C) from 5–30% by weight of drying oil acid ester of an hydroxy ester of monoethylenically unsaturated acid and aliphatic polyhydric alcohol copolymerizable with said acrylamide and said other polymerizable ethylenically unsaturated material, at least 80% of the available hydroxy groups in said last-named ester being esterified by said drying oil acid, said component (B) constituting the balance of said interpolymer, at least a portion of the amido hydrogen atoms in the interpolymer being replaced by the structure

in which R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical.

8. An interpolymer as recited in claim 7 in which said component (C) is the ester of frosting oil acid with 2-hydroxy ethyl methacrylate and said component (B) includes monomer selected from the group consisting of styrene, $C_1$–$C_4$ alkyl-substituted styrene, halogen-substituted styrene and methyl methacrylate in an amount of at least 40% on said weight basis.

9. An interpolymer as recited in claim 7 in which amido groups supplied by said acrylamide are reacted with formaldehyde.

10. A heat-hardenable resinous composition comprising an organic solvent solution having dissolved therein a non-gelled interpolymer of: (A) from 5–45% by weight, based on the total weight of unsaturated polymerizable material, of an amide of a monoethylenically unsaturated carboxylic acid; (B) at least one other polymerizable ethylenically unsaturated material copolymerizable with said amide; and (C) from 3–50%, based on the total weight of unsaturated polymerizable material, of drying oil acid ester of ethylenically unsaturated hydroxy-containing monomer copolymerizable with said amide and said other polymerizable ethylenically unsaturated material, said drying oil acid esterifying at least 50% of the hydroxy groups of said hydroxy-containing monomer, said component (B) constituting the balance of said interpolymer, at least a portion of the amido hydrogen atoms in the interpolymer being replaced by the structure

in which R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical, and said interpolymer being substantially the sole film-forming resin present in said composition.

11. A heat-hardenable resinous composition comprising an organic solvent solution having dissolved therein a non-gelled interpolymer of: (A) from 5–30% by weight of acrylamide; (B) at least one other polymerizable ethylenically unsaturated material copolymerizable with said acrylamide comprising at least 40% by weight of monomer selected from the group consisting of styrene, $C_1$–$C_4$ alkyl-substituted styrene, halogen-substituted styrene and methyl methacrylate; and (C) from 7–20% by weight of frosting oil fatty acid ester of 2-hydroxy ethyl methacrylate copolymerizable with said acrylamide and said other polymerizable ethylenically unsaturated material, said frosting oil acid esterifying at least 50% of the hydroxy groups of said 2-hydroxy ethyl methacrylate, said component (B) constituting the balance of said interpolymer, at least a portion of the amido hydrogen atoms in said interpolymer being reacted with formaldehyde, said weight percentages being based on the total weight of unsaturated polymerizable material, and said interpolymer being substantially the sole film-forming resin present in said composition.

12. A heat-hardenable resinous composition comprising an organic solvent solution having dissolved therein a non-gelled interpolymer of: (A) from 5–45% by weight, based on the total weight of unsaturated polymerizable material, of an amide of a monoethylenically unsaturated carboxylic acid; (B) at least one other polymerizable ethylenically unsaturated material copolymerizable with said amide; and (C) from 3–50%, based on the total weight of unsaturated polymerizable material, of drying oil acid ester of ethylenically unsaturated hydroxy-containing monomer copolymerizable with said amide and said other polymerizable ethylenically unsaturated material, said drying oil acid esterifying at least 50% of the hydroxyl groups of said hydroxy-containing monomer, said component (B) constituting the balance of said interpolymer, at least a portion of the amido hydrogen atoms in the interpolymer being replaced by the structure

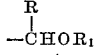

in which R is selected from the group consisting of hydrogen, furyl, and saturated lower aliphatic hydrocarbon radicals containing up to 10 carbon atoms, and $R_1$ is selected from the group consisting of hydrogen, and alkyl and alkoxy alkyl radicals containing up to 10 carbon atoms in the radical, and said organic solvent solution further having dissolved therein from 15–60% of an aminoplast resin, based on the total weight of said interpolymer and said aminoplast resin.

13. A resinous composition as recited in claim 12 in which said aminoplast resin is a heat-hardening, solvent-soluble condensation product of a triazine with excess formaldehyde present in an amount of at least 20% by weight of the total weight of said interpolymer and said aminoplast resin.

14. An article having a metal surface having as a coating thereon a heat-hardened film comprising the baked interpolymer of claim 1.

References Cited by the Examiner
UNITED STATES PATENTS

| | | | |
|---|---|---|---|
| 2,940,945 | 6/1960 | Christenson et al. | 260—21 |
| 2,978,437 | 4/1961 | Christenson et al. | 260—72 |
| 3,037,963 | 6/1962 | Christenson | 260—23 |
| 3,163,615 | 12/1964 | Sekmakas | 260—21 |

LEON J. BERCOVITZ, *Primary Examiner.*